US006968081B1

United States Patent
Judson et al.

(10) Patent No.: US 6,968,081 B1
(45) Date of Patent: Nov. 22, 2005

(54) SYSTEM, METHOD, AND APPARATUS FOR ORIENTING IMAGES

(75) Inventors: Ross Judson, Alexandria, VA (US); Patrick Meenan, Gainesville, VA (US)

(73) Assignee: Luminus Systems, Inc., Herndon, VA (US)

( * ) Notice: Subject to any disclaimer, the term of this patent is extended or adjusted under 35 U.S.C. 154(b) by 0 days.

(21) Appl. No.: 09/712,658

(22) Filed: Nov. 14, 2000

Related U.S. Application Data

(60) Provisional application No. 60/165,634, filed on Nov. 15, 1999.

(51) Int. Cl.[7] ............................................... G06K 9/62
(52) U.S. Cl. ........................... 382/157; 706/16; 706/25; 700/48
(58) Field of Search .................................. 382/155, 156, 382/157, 158, 159; 128/925; 706/15, 16, 20, 25, 26, 27; 700/47, 48

(56) References Cited

U.S. PATENT DOCUMENTS

| | | | | |
|---|---|---|---|---|
| 5,424,773 A | * | 6/1995 | Saito | 348/218.1 |
| 5,845,048 A | * | 12/1998 | Masumoto | 706/20 |
| 5,878,165 A | * | 3/1999 | Ono | 382/199 |
| 5,887,078 A | * | 3/1999 | Kwon et al. | 382/156 |
| 5,982,483 A | * | 11/1999 | Lauinger et al. | 356/239.2 |
| 6,101,270 A | * | 8/2000 | Takahashi | 382/158 |
| 6,128,397 A | * | 10/2000 | Baluja et al. | 382/118 |
| 6,208,758 B1 | * | 3/2001 | Ono et al. | 382/190 |
| 6,281,928 B1 | * | 8/2001 | Umezaki et al. | 348/148 |
| 6,324,532 B1 | * | 11/2001 | Spence et al. | 706/27 |

* cited by examiner

Primary Examiner—Samir Ahmed
(74) Attorney, Agent, or Firm—Law Offices of Grady L. White; Grady L. White

(57) ABSTRACT

The present invention is directed to a system, method, and apparatus for orienting images. A neural net is trained with images of known orientation and an indicator indicating such known orientation. Images of unknown orientation are then input to the neural net and the orientation is determined based on the output of the neural net.

15 Claims, 7 Drawing Sheets

SYSTEM, METHOD, AND APPARATUS FOR ORIENTING IMAGES

PRIORITY INFORMATION

This application claims the priority of provisional patent application serial No. 60/165,634, entitled "Method for Orienting Digital Images", by Ross Judson and Patrick Meenan, filed Nov. 15, 1999, and which is hereby incorporated by reference for all purposes.

FIELD

The present invention relates to image processing and more particularly to a system, method, and apparatus for orienting images.

BACKGROUND

Rolls of photographic film are processed with different orientations depending on the type of camera used. Photographs taken with cameras that store unused film on the left side of the camera are oriented 180 degrees from photographs taken with cameras that store unused film on the right side. As a result, approximately 50% of the rolls processed by a film-processing lab are processed and delivered to the customer "upside-down". Additionally, camera users often rotate the camera 90 degrees to one side in order to take portrait-style pictures. When the roll of film is processed, each of the portrait-style photographs will come out "sideways". Where physical prints are processed, "upside-down" or "sideways" photographs are not a significant problem because the customer can simply rotate the print to correct the orientation.

With digital image processing, the customer may never actually receive physical prints. Instead, images are delivered to the customer in electronic format. For example, the customer may receive a Compact Disc—Read Only Memory (CD-ROM) or floppy disk. Alternatively, the digital images can be delivered to the user using the Internet. If the digital images are stored and delivered to the customer "upside-down" or "sideways", the customer cannot easily correct the orientation. Software must be used to manipulate the image. The foregoing requires manipulation of large amounts of memory, which is often slow with high resolution images. Additionally, where the images are provided on a read-only medium, such as a CD-ROM, the memory cannot be manipulated. Therefore, images stored improperly oriented will always be improperly oriented on the read-only medium.

The foregoing problem is prevented by having a person view the roll of film prior to storage on the delivery medium, and manually rotate the rolls to correct the orientation. Viewing and correcting the orientation significantly increases the time, cost, and resources required to process and deliver digital images.

Accordingly, it would be advantageous if digital images could be stored properly oriented in a quick and cost-effective manner.

SUMMARY

The present invention is directed to a system, method, and apparatus for orienting an image. A neural net is trained with a sample of images of known orientation. After the neural net is trained, the image is provided to the neural net and a confidence factor is measured for each of the possible orientations. The orientation with the highest confidence factor is selected as the proper orientation and the image is oriented in accordance with the selected orientation.

DETAILED DESCRIPTION

Figure 1:
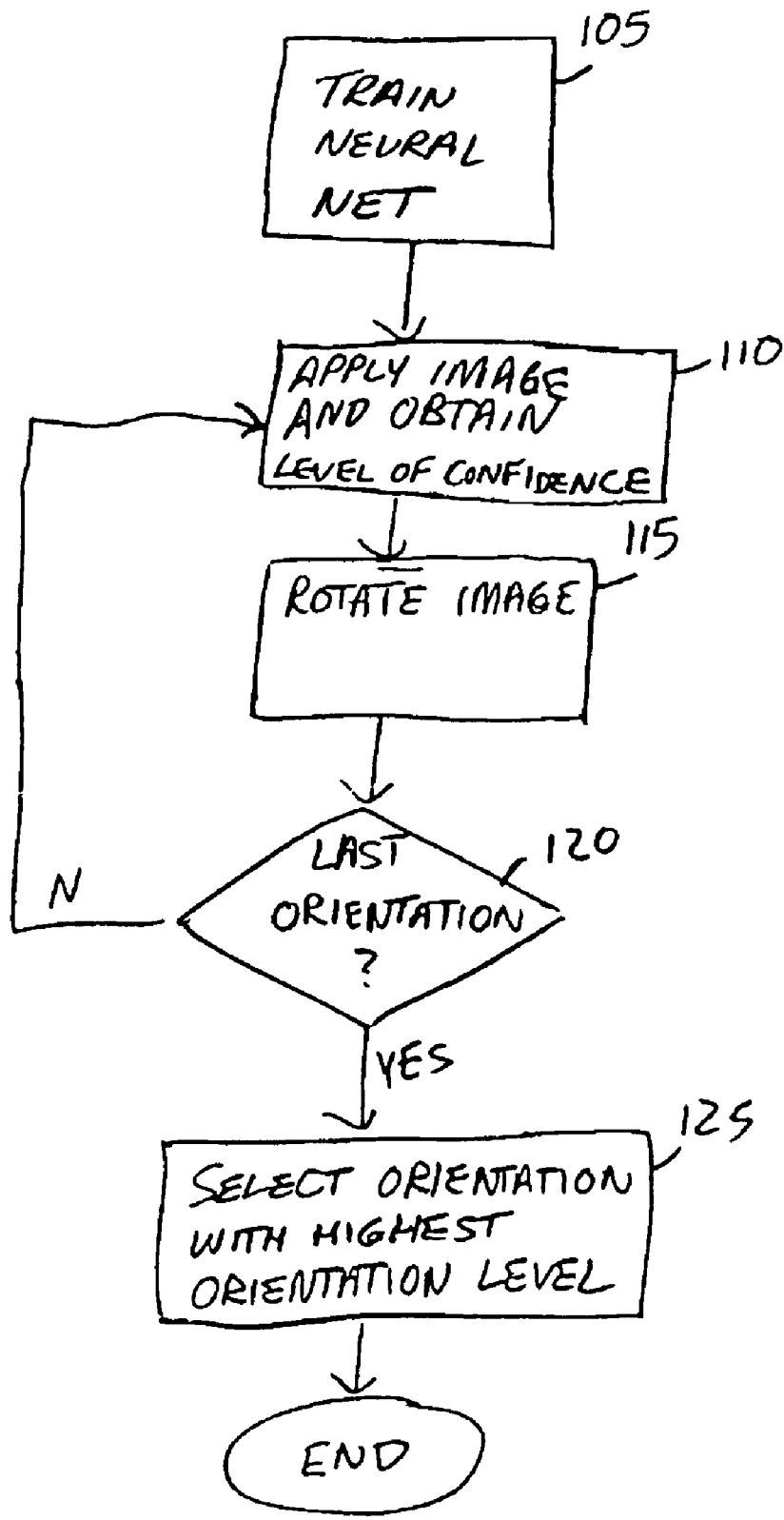
FIG. 1 is a flow diagram describing the orientation of an input digital image.

Referring now to FIG. 1, there is illustrated a flow diagram describing the orientation of an input digital image. At step 105, a neural net is trained to understand the difference between images of known orientation. The neural network receives as input a suitably large set of sample images which are known to be oriented or disoriented. The neural net calculates internal parameters known as answers from the input digital images and their known orientations and keeps track of the differences between the properly oriented images and the disoriented images.

Upon completion of the training (step 105), images of unknown orientation are applied to the neural net and a value representing the likelihood of proper orientation, known as a level of confidence, is generated (step 110). The image is then rotated 90 degrees (step 115) and the rotated image is applied to the neural net. Steps 105–115 are repeated for each of the four possible orientations. After the steps 105–115 are performed for each of the four possible orientations (step 120), the orientation associated with the highest confidence level from step 110 is selected and is output (step 125).

Figure 2:
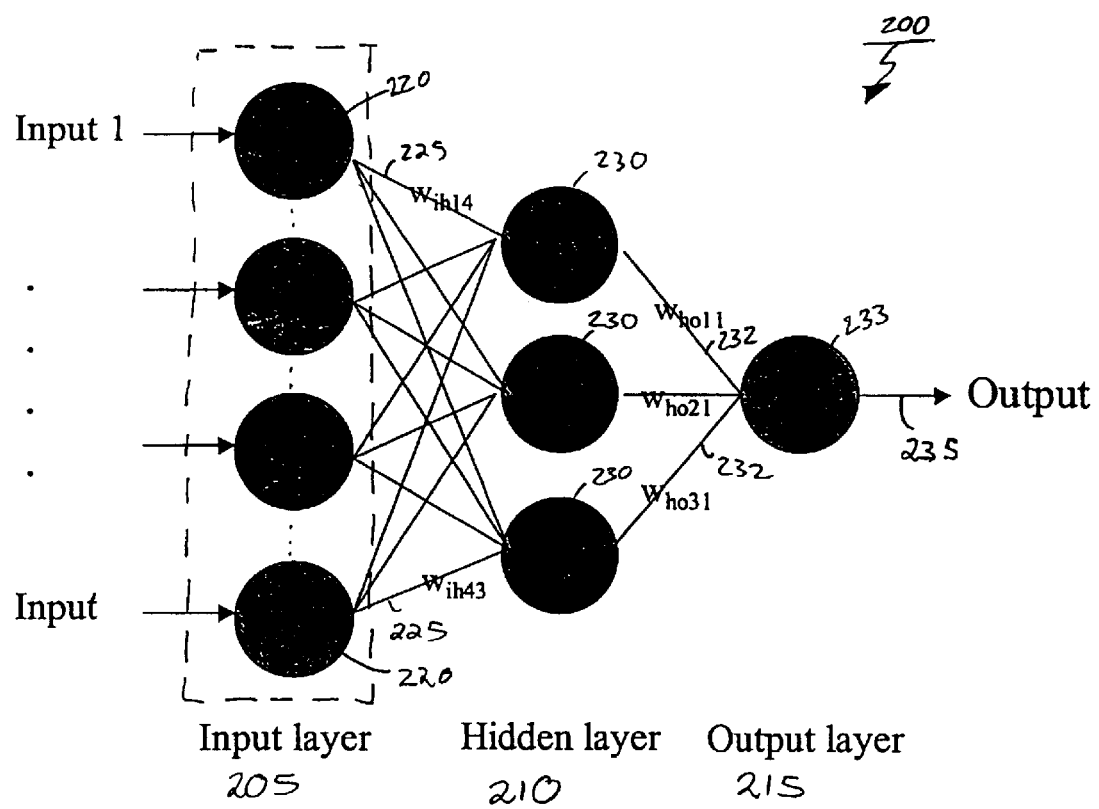
FIG. 2 is a block diagram of an exemplary neural net.

Referring now to FIG. 2, there is illustrated a block diagram of an exemplary neural net, referenced generally by the numeric designation 200, for orienting digital images. The neural net 200 can include three-layers—an input layer 205, a hidden layer 210, and an output layer 215. The input layer 205 includes a plurality of nodes 220 for receiving inputs, wherein each node receives a single input. The inputs are received by the nodes 220 of the input layer 205. The inputs received at each input layer node 220 is sent to each one of a plurality of nodes 230 in the hidden layer 210, by a plurality of connections 225. Each connection 225 receives an input from one of the input layer nodes 220, applies a weight thereto, and provides the weighted input to one of the nodes 230 of the hidden layer 210.

Each of the nodes 230 of the hidden layer 210 receives a set of weighted inputs from a portion of the connections 225. The hidden layer node 230 combines the weighted inputs from the portion of the connections 225, producing combined weighted inputs, and applies a mathematical transformation thereto, to provide transformed weighted inputs. The transformed weighted inputs are received by an output layer node 233 via connections 232. Each of the connections 232 apply a particular weight to the transformed weighted input. The result from each of the connections 232 is received at output layer node 233. The output layer node 233 combines the results of each connection 232, and applies a mathematical transformation to provide an output 235.

The range of the output 235 is mapped to discrete answers, wherein one end of the range is mapped to an answer is indicative of the digital image properly oriented, and other end of the range is mapped to an answer which is indicative of the image improperly oriented. Additionally, a portion of the range centered at the middle of the range can be mapped to an indeterminate answer. The range of the output 235 as well as the mapping of the range to the answers are predefined.

The neural net 200 is first trained in order to determine the orientation of digital images. During the training of the neural net, the range of the output 235 is determined and mapped to the answers. The particular weights applied by connections 225 and connections 232 are also determined.

Figure 3:
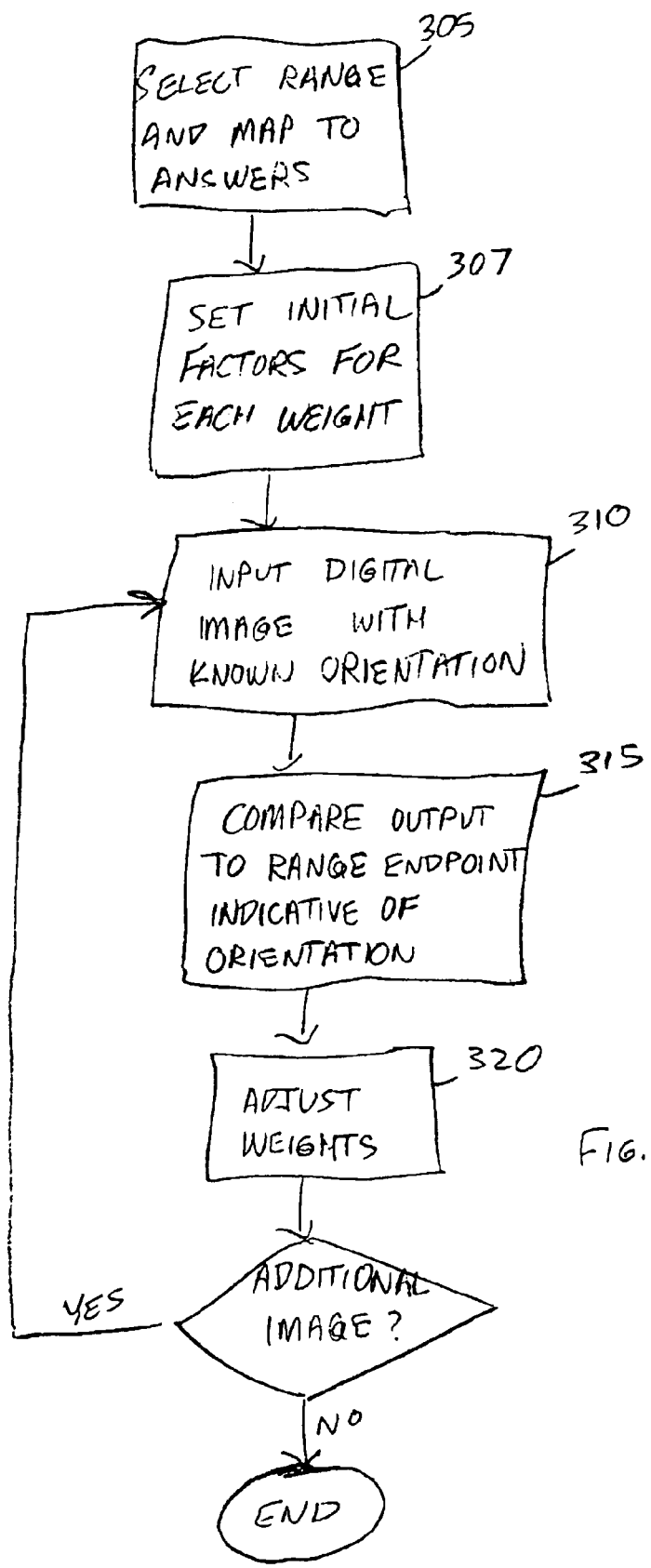
FIG. 3 is a flow diagram describing the training of the neural net.

Referring now to FIG. 3, there is illustrated a flow diagram describing the training of the neural net 200. At step 305, a range is selected for the output 235 and mapped to the answers. For example, the range of the output can be defined as between 0 and 1, wherein 1 represents proper orientation and 0 represents improper orientation. Alternatively, the range can be defined as between −1 and 1, wherein 1 represents proper orientation and −1 represents improper orientation.

At step 307, a set of arbitrary weights are associated with each connection 225, 232. At step 310, digital images with known orientation are input to the input layer 205 and the output 235 is compared (step 315) to the range endpoint indicative of the orientation. Based on the comparison the weights associated with each connection 225, 232 are adjusted (step 320) in a manner well known in the art.

Figure 4:
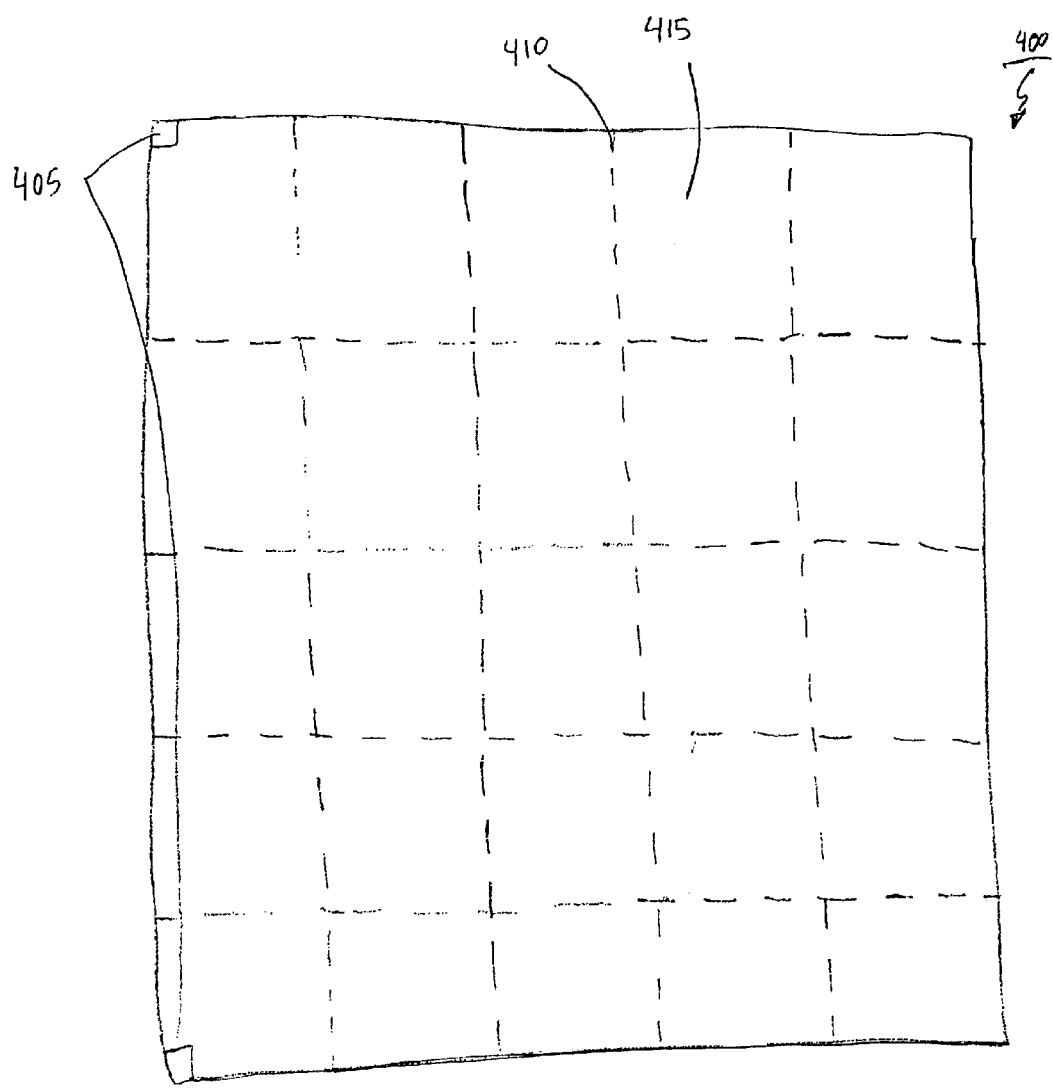
FIG. 4 is a block diagram of a digital image.

The digitized image must be input as a set of numeric values because the neural net 200 requires numeric data. Referring now to FIG. 4, there is illustrated a block diagram of a digital image 400. Those skilled in the art will recognize that the digitized image comprises a plurality of pixels 405. Each pixel is associated with location coordinates and a color value. The color value is based on certain predefined conventions. An example of a convention for defining a color value is the 24-bit red channel, green channel, blue channel (RGB) color values. Accordingly, the RGB values of different pixels can be input to the input layer 205. The location coordinates of the pixel can be implicitly provided to the neural net 200 by associating each node 220 of the input layer 205 with a particular set of location coordinates. However, picture quality images are often composed of 800×600 pixels. Therefore, association of an input layer node 220 with each pixel's RGB values may not be feasible.

To reduce the required number of input layer nodes 220, the resolution of the digital image can be reduced to a smaller number of pixels. For example, the digital image can be mapped to a 5×5 grid 410. The RGB values of each pixel in a particular section 415 of the grid 410 can be averaged to yield average RGB values. The resulting grid 410 of average color values can be input to the input nodes 220, wherein each input node 220 is associated with a particular section 415 of the grid 410.

Referring again to FIG. 3, the foregoing steps 310–320 are repeated for a sample of digital images of known orientation. Those skilled in the art will recognize that as the number of digital images increases, the adjustments during step 320 become smaller. Additionally, a properly-oriented digital image can be provided along with the range endpoint indicating the same. The digital image can then be rotated 90, 180, and 270 degrees and applied, along with the range endpoint indicating that the image is improperly oriented.

Additionally, the sample of digital images can be large (several thousand images) and include a broad set of image types. For example, the sample images can include a variety of different types of scenes, including beach and water scenes, sunsets, landscapes, buildings, streets, people, and faces. After the sample of digital images has been applied to the neural net 200, the training of the neural net is complete.

Figure 5:
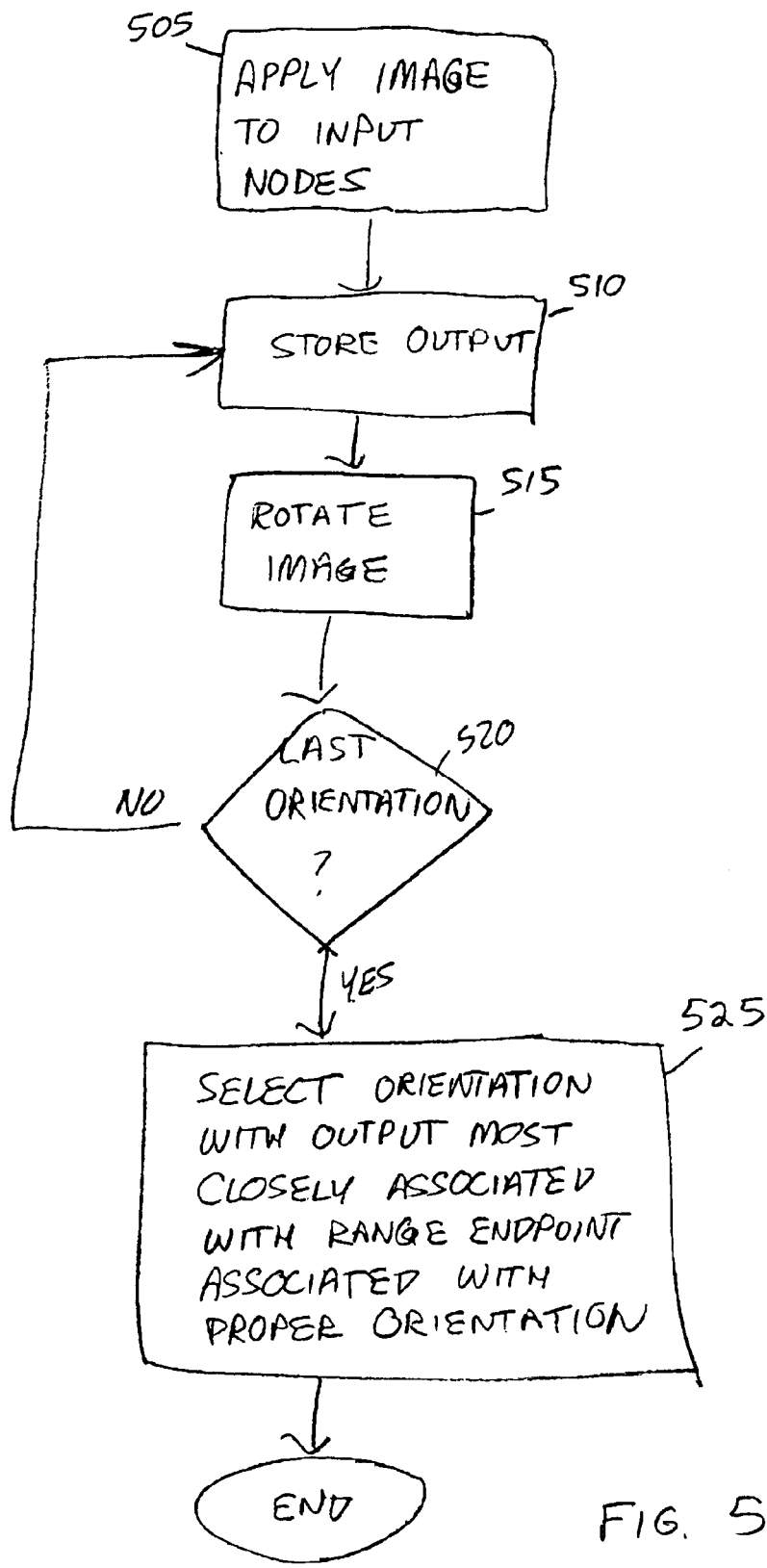
FIG. 5 is a flow diagram describing the orientation of digital images.

After the neural network 200 is trained, the neural network 200 can be used to properly orient images. Referring now to FIG. 5, there is illustrated a flow diagram describing the orientation of digital images. At step 505, the digital image is applied to the input layer nodes 220 of a trained neural network in the same manner as during the training phase described above. At step 510, the output 235 is stored, and the digital image is rotated 90 degrees (step 515). The foregoing steps 505–515 are repeated for each of the four possible orientations (step 520). After steps 505–515 are repeated for each of the four possible orientations (step 520), the orientation associated with the output 235 most closely associated with the range endpoint associated with proper orientation is selected (step 525).

The neural net 200 properly orients single digital images in the foregoing manner. However, digital images often are provided in sets or series. For example, the digital images may be generated from a roll of film. Wherein a plurality of digital images are generated from a common source, the orientations of the each of the plurality of digital images are correlated. For example, the orientation of an image is often due to the side of the camera where the unused film is stored. Therefore, there is a likelihood that each of the digital images generated from a roll of film are oriented in a similar manner. The foregoing correlation can be used to properly orient a plurality of images from a common source.

Figure 6:
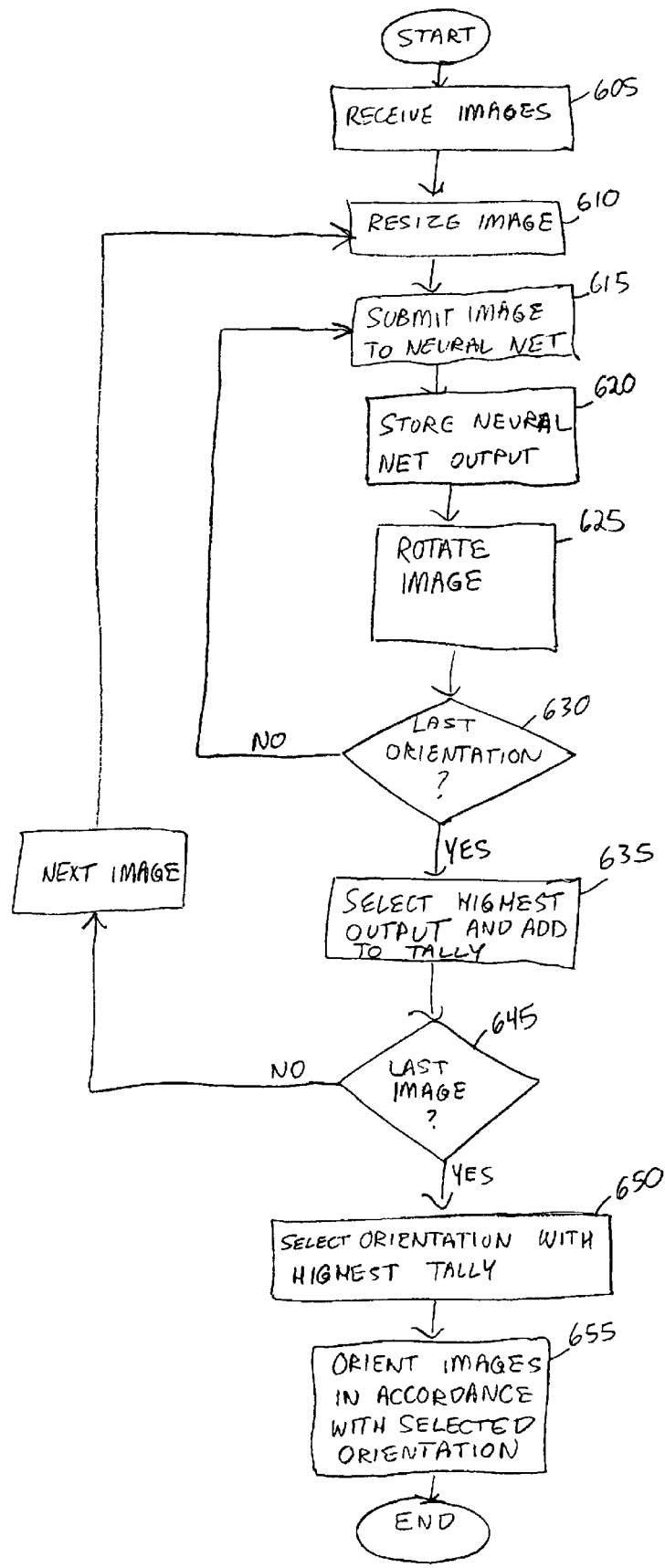
FIG. 6 is a flow diagram describing the orientation of a plurality of digital images from a common source.

Referring now to FIG. 6, there is illustrated a flow diagram describing the orientation of a plurality of digital images from a common source. At step 605, the images are received. At step 610, an image is examined and resized to a 5×5 grid as described above. The image is then submitted (step 615) to a trained neural network, wherein a high output is indicative of proper orientation, and the neural network output is stored (step 620). The image is then rotated 90 degrees (step 625), and the steps 615–625 are performed for each possible orientation. After each possible orientation is evaluated in step 630, the highest output is selected and added (step 635) to a running tally for the orientation associated therewith. The next image is then examined (step 640). The foregoing steps 610–640 are repeated for each image of the plurality of images until the last image is examined (step 645). After the last image is examined, the orientation with the highest tally is selected (step 650) and the entire plurality of images are oriented in accordance with the orientation with the highest tally (step 655).

It is noted that in the foregoing example, the neural net is trained, such that a high output is associated with a proper orientation. Alternatively, wherein a neural net is trained such that a low output is associated with proper orientation, the orientation with the lowest output can be eliminated and the remaining outputs can be added to the running tally for the orientations associated therewith during step 635. At step 650, the orientation with the lowest tally is selected as the proper orientation for the plurality of images.

Figure 7:
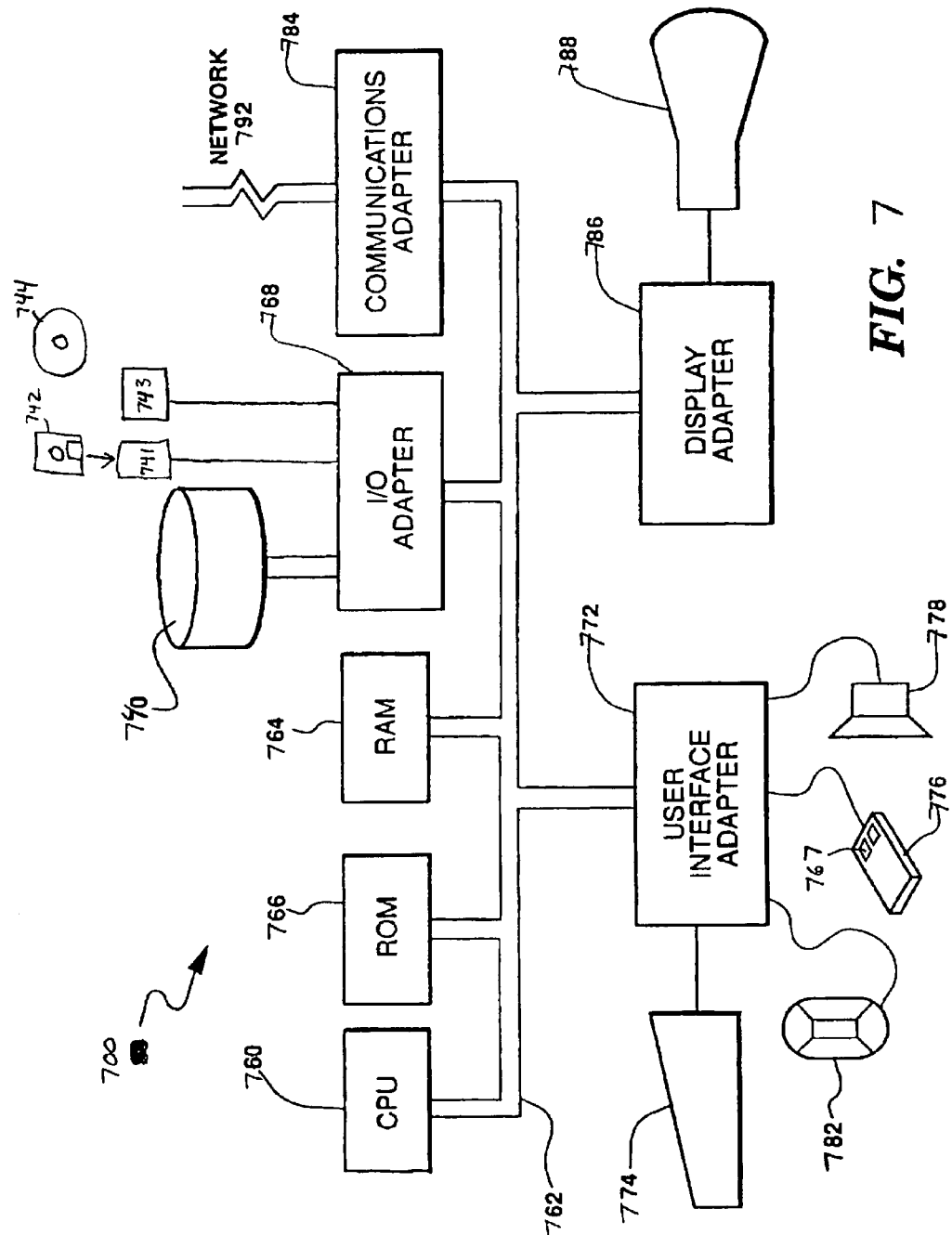
FIG. 7 is a block diagram of a computer system configurable in accordance with the present invention.

Referring now to FIG. 7, there is illustrated a block diagram of a computer system, referenced generally by the numeric reference 700, for properly orienting a digital image. The computer system 700 includes a CPU 760 which is interconnected via system bus 762 to random access memory (RAM) 764, read only memory (ROM) 766, an input/output (I/O) adapter 768, a user interface adapter 772, communications adapters 784, and a display adapter 786.

The input/output (I/O) adapter 768 connects peripheral devices such as hard disc drives 740, floppy disc drives 741 for reading removable floppy discs 742, and optical disc drives 743 for reading removable optical disc 744 (such as a compact disc or a digital versatile disc) to the bus 762. The user interface adapter 772 connects devices such as a keyboard 774, a mouse 776 having a plurality of buttons 767, a speaker 778, a microphone 782, and/or other user interfaces devices such as a touch screen device (not shown) to the bus 762. The display adapter 786 connects a monitor 788 to the bus 762. The communications adapters 784 connect the computer system to a data processing network 792. The data processing network 792 may include any number of other computer systems, as well as mass storage elements such as another hard disc drive 740, or another optical disc drive 743 for reading optical discs 744.

In one embodiment, the invention can be implemented as a set of instructions resident in the RAM 764 of one or more computer systems 700 configured generally as described in FIG. 7. Until required by the computer system, the set instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information.

Although the embodiments explained herein have been described with particularity, the present invention is not limited to these embodiments, but various changes and modifications can be made without departing from the spirit and scope of the invention.

What is claimed is:

1. A method for orienting an image, said method comprising:
   training a neural net at least one image with known orientation associated with at least one indicator, wherein the at least one indicator is assigned a first value if the at least one image is properly oriented and a second value if the at least one image is improperly oriented;
   inputting the image to the neural net;
   receiving the output of the neural net, responsive to submitting the image; and
   determining the orientation of the image responsive to receiving the output.

2. The method of claim 1, wherein submitting the image to the neural net comprises:
   inputting the image to the neural net with a first orientation; and
   inputting the image to the neural net with a second orientation.

3. The method of claim 2, wherein receiving the output of the neural net comprises:
   receiving a first output of the neural net responsive to inputting the image to the neural net with the first orientation; and
   receiving a second output of the neural net responsive to inputting the image to the neural net with the second orientation.

4. The method of claim 3, wherein determining the orientation of the image comprises:
   selecting the first orientation wherein the first output is closer to the first value; and
   selecting the second orientation wherein the second output is closer to the second value.

5. The method of claim 1, further comprising:
   reducing the resolution of the image.

6. An article of manufacture comprising computer readable medium, said computer readable medium storing a plurality of executable instructions, said plurality of executable instructions comprising means for:
   training a neural net at least one image with known orientation associated with at least one indicator, wherein the at least one indicator is assigned a first value if the at least one image is properly oriented and a second value if the at least one image is improperly oriented;
   inputting the image to the neural net;
   receiving the output of the neural net, responsive to submitting the image; and
   determining the orientation of the image responsive to receiving the output.

7. The article of manufacture of claim 6, wherein the means for submitting the image to the neural net comprises means for:
   inputting the image to the neural net with a first orientation; and
   inputting the image to the neural net with a second orientation.

8. The article of manufacture of claim 7, wherein the means for receiving the output of the neural net comprises means for:
   receiving a first output of the neural net responsive to inputting the image to the neural net with the first orientation; and
   receiving a second output of the neural net responsive to inputting the image to the neural net with the second orientation.

9. The article of manufacture of claim 8, wherein the means for determining the orientation of the image comprises means for:
   selecting the first orientation wherein the first output is closer to the first value; and
   selecting the second orientation wherein the second output is closer to the second value.

10. The article of manufacture of claim 6, further comprising means for:
    compressing the image.

11. A computer system for orienting a digital image, said computer system comprising:
    a processor for performing processing functions;
    memory;
    means for training a neural net at least one image with known orientation associated with at least one indicator, wherein the at least one indicator is assigned a first value if the at least one image is properly oriented and a second value if the at least one image is improperly oriented;
    means for inputting the image to the neural net;
    means for receiving the output of the neural net, responsive to submitting the image; and means for determining the orientation of the image responsive to receiving the output.

12. The computer system of claim 11, wherein the means for submitting the image to the neural net comprises means for:
   inputting the image to the neural net with a first orientation; and
   inputting the image to the neural net with a second orientation.

13. The computer system of claim 12, wherein the means for receiving the output of the neural net comprises means for:
   receiving a first output of the neural net responsive to inputting the image to the neural net with the first orientation; and
   receiving a second output of the neural net responsive to inputting the image to the neural net with the second orientation.

14. The computer system of claim 13, wherein the means for determining the orientation of the image comprises means for:
   selecting the first orientation wherein the first output is closer to the first value; and
   selecting the second orientation wherein the second output is closer to the second value.

15. The computer system of claim 11, further comprising means for:
   compressing the image.

* * * * *